US010459994B2

United States Patent
Maldonado Cabrera et al.

(10) Patent No.: US 10,459,994 B2
(45) Date of Patent: Oct. 29, 2019

(54) DYNAMICALLY TAGGING WEBPAGES BASED ON CRITICAL WORDS

(71) Applicant: INTERNATIONAL BUSINESS MACHINES CORPORATION, Armonk, NY (US)

(72) Inventors: Raquel Maldonado Cabrera, Zapopan (MX); Jose R. Mosqueda Mejia, Puruandiro (MX)

(73) Assignee: International Business Machines Corporation, Armonk, NY (US)

( * ) Notice: Subject to any disclaimer, the term of this patent is extended or adjusted under 35 U.S.C. 154(b) by 500 days.

(21) Appl. No.: 15/168,644

(22) Filed: May 31, 2016

(65) Prior Publication Data

US 2017/0344637 A1 Nov. 30, 2017

(51) Int. Cl.
*G06F 16/9535* (2019.01)

(52) U.S. Cl.
CPC .................. *G06F 16/9535* (2019.01)

(58) Field of Classification Search
None
See application file for complete search history.

(56) References Cited

U.S. PATENT DOCUMENTS

| | | | | |
|---|---|---|---|---|
| 9,262,510 B2* | 2/2016 | Gattiker | ............ | G06F 17/30011 |
| 9,280,742 B1* | 3/2016 | Sargin | ............ | G06N 5/04 |
| 9,372,838 B2* | 6/2016 | Gupta | ............ | G06F 17/30908 |
| 9,424,264 B2* | 8/2016 | Barton | ............ | G06F 17/3082 |
| 9,569,538 B1* | 2/2017 | Clark | ............ | G06F 16/951 |
| 2002/0065857 A1* | 5/2002 | Michalewicz | ........ | G06F 16/355 |
| | | | | 715/259 |
| 2009/0094189 A1 | 4/2009 | Stephens | | |
| 2009/0172026 A1 | 7/2009 | Brownholtz et al. | | |
| 2010/0057763 A1* | 3/2010 | Smith | ............ | G06F 17/2705 |
| | | | | 707/E17.044 |
| 2010/0146010 A1 | 6/2010 | Muller et al. | | |
| 2010/0180218 A1 | 7/2010 | Boston et al. | | |
| 2010/0306307 A1 | 12/2010 | Baessler et al. | | |
| 2011/0078584 A1 | 3/2011 | Winterstein et al. | | |
| 2014/0089330 A1 | 3/2014 | Cui et al. | | |
| 2015/0256636 A1* | 9/2015 | Spivack | ............ | G06Q 10/10 |
| | | | | 715/736 |
| 2017/0091879 A1* | 3/2017 | Kanner | ............ | G06Q 50/08 |
| 2017/0109454 A1* | 4/2017 | Berk | ............ | G06F 17/30864 |

OTHER PUBLICATIONS

Hsu et al., "Tag Normalization and Prediction for Effective Social Media Retrieval," IEEE/WIC/ACM International Conference on Web Intelligence and Intelligent Agent Technology, 2008, p. 770-774, IEEE Computer Society.

(Continued)

*Primary Examiner* — Uyen T Le
(74) *Attorney, Agent, or Firm* — Robert J. Shatto

(57) ABSTRACT

A webpage is received. A request to tag a webpage is received. The webpage may be parsed in response to the received request to tag the webpage. One or more critical words may be identified within the parsed webpage. A tag dictionary may be searched for the identified one or more critical words. One or more tags for selection by an end user may be displayed in response to searching the tag dictionary. The parsed webpage may be tagged with a received selection of a tag of the displayed one or more tags.

20 Claims, 6 Drawing Sheets

(56) References Cited

OTHER PUBLICATIONS

Markines et al., "Evaluating Similarity Measures for Emergent Semantics of Social Tagging," Proceedings of the 18th International Conference on World Wide Web (WWW 2009), Apr. 20-24, 2009, p. 641-650, ACM, Madrid, Spain.
Mell et al., "The NIST Definition of Cloud Computing," National Institute of Standards and Technology, Sep. 2011, p. 1-3, Special Publication 800-145.

* cited by examiner

DYNAMICALLY TAGGING WEBPAGES BASED ON CRITICAL WORDS

BACKGROUND

The present invention relates generally to the field of data processing, and more particularly to software development, installation, and management.

A tag is a non-hierarchical keyword or term assigned to an item (such as an application, software, file, or computer program). A tag can be a type of metadata that helps describe an item and can allow it to be found again by browsing or searching. Tags are generally chosen informally and personally by the item's creator or by its viewer, depending on the system. Tagging can be applied to social platforms and communities within a distributed computing environment.

SUMMARY

Embodiments of the present invention disclose a method, computer program product, and system for dynamically tagging a webpage. A webpage from a network server is received. A request to tag a webpage is received. The webpage is parsed in response to the received request to tag the webpage. One or more critical words are identified within the parsed webpage. A tag dictionary is searched for the identified one or more critical words. One or more tags for selection by an end user is displayed in response to searching the tag dictionary. The parsed webpage is tagged with a received selection of a tag of the displayed one or more tags.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
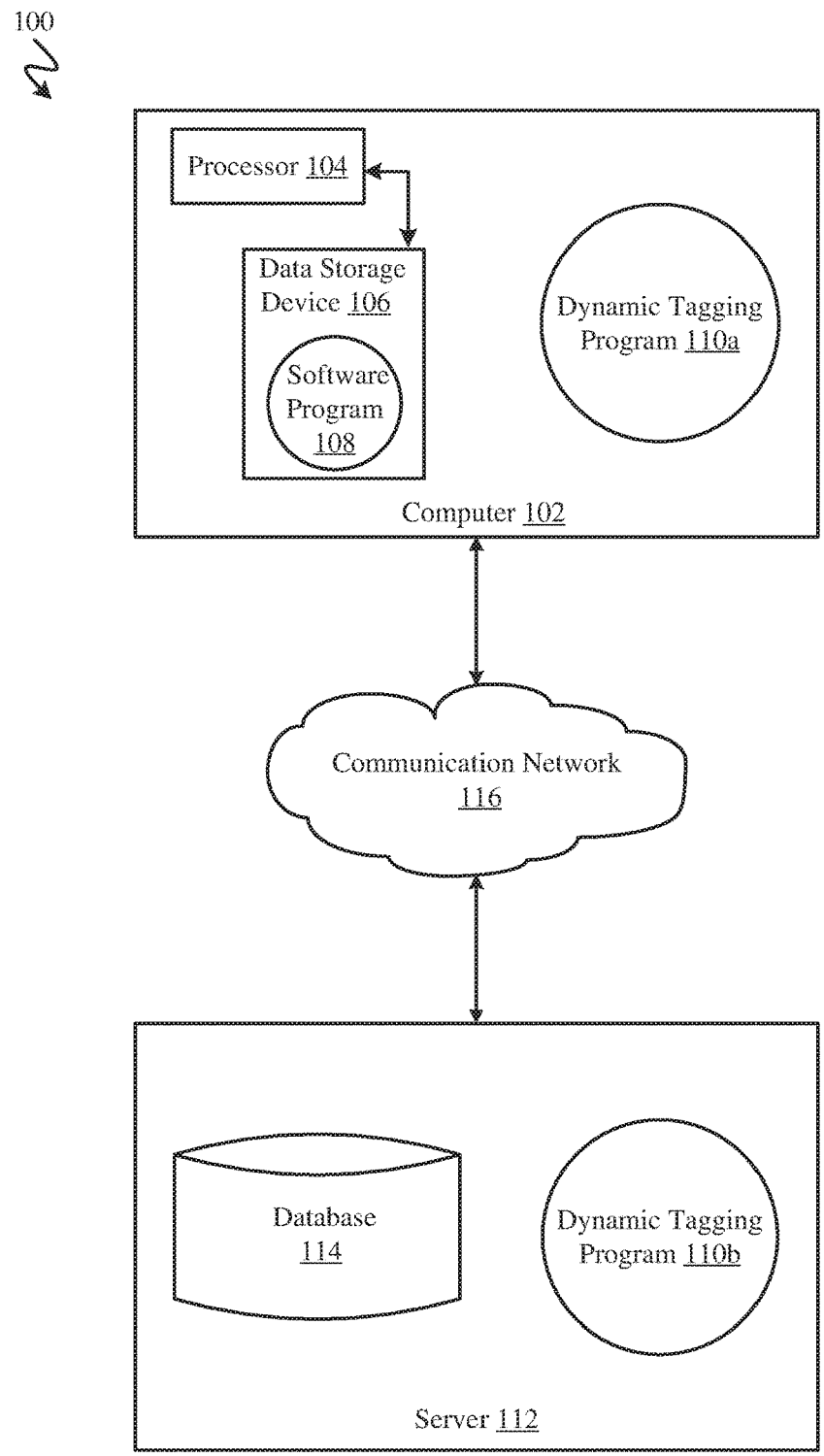
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Often times, an end user may tag related webpages within a computing environment with substantially different key terms or phrases. Currently, there may be no way for the end user to identify which critical words or phrases were used to tag a particular webpage without manually searching the webpage. The end user may forget which critical words were used to tag the webpage. A lack of dynamic tagging or intelligently describing the webpage based on previously used critical words and tags may lead to multiple tags for substantially related webpages. Furthermore, multiple tags for a single webpage or related webpages across a datacenter may be wasteful of valuable resources, particularly storage. In today's cloud economy, storage is a highly sought after resource and reduction in storage footprint may lead to direct savings for the consumer. Additionally, the end user's time may be wasted when searching through or entering multiple tags for related webpages.

Therefore, it may be advantageous to, among other things, provide a way to dynamically extract critical words within a webpage and compare the extracted critical words to a tag dictionary that includes one or more critical words associated with existing tags of webpages. A tag may be automatically generated if the extracted critical words do not match one or more critical words associated with existing tags, or an existing tag may be used if the extracted critical words match with one or more critical words associated with the existing tags.

According to one embodiment, a tagging program may be implemented to assist end users with consistent tagging of related webpages of a network, e.g. a computing environment, by automatically parsing proposed tags. The critical words within the proposed tag may be identified then compared to critical words within a tag dictionary. Each critical word within the tag dictionary may be associated with an existing tag. An existing tag may be tags that have been previously assigned to webpages by the tagging program or by the user. Critical words of the proposed tag may include nouns, adjectives, and verbs describing the webpage. The tagging program can also remove and/or update critical words associated with an existing tag, and/or recommend one or more existing tags within the tag dictionary to the user based on critical words identified in the proposed tag. Reusing a single tag for multiple related webpages may reduce wasted resources (e.g., memory or processing power within the computing environment).

A tag may be a non-hierarchical keyword or term assigned to a piece of information or webpage that describes the webpage. The tag can be associated with a webpage based on critical words of the tag describing the webpage. The associated tag can be displayed within a user interface (UI). The UI can display a tag that is associated with multiple related webpages. This visual representation via the UI can help a user clearly identify multiple related webpages based on a single tag. The UI can also be interactive so as to allow the user to adjust the detail of the tags (e.g., critical words of the tag). Adjusting the detail of the tag can include changing the critical words of the tag. The critical words of existing tags within the tag dictionary may be weighted and may be automatically adjusted according to how much the user utilizes the critical words corresponding to the tags. Creating a universal tag that may be used by an end user to tag multiple related webpages can increase the likelihood of the user being able to clearly identify the webpages.

The following described exemplary embodiments provide a system, method and program product for dynamically tagging webpages based on keywords within the content of the webpage. As such, the present embodiment has the capacity to improve the technical field of data processing by organizing webpages according to content found within the webpages. More specifically, reducing redundant or relevant webpages within a system or datacenter by dynamically tagging webpages according to content within the webpage so that a user may reduce wasting resources.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a dynamic tagging program 110a. The networked computer environment 100 may also include a server 112 that is enabled to run a dynamic tagging program 110b that may interact with a database 114 and a communication network 116. The networked computer environment 100 may include one or more computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the dynamic tagging program 110a, 110b may interact with a database 114 that may be embedded in various storage devices, such as, but not limited to a computer/mobile device 102, a networked server 112, or a cloud storage service. The database 114 can include a tag dictionary. The dynamic tagging program 110a and 110b may be updated in any system associated with the dynamic tagging program 110a and 110b (e.g., database 114).

According to the present embodiment, a user using a client computer 102 or a server computer 112 may use the dynamic tagging program 110a, 110b (respectively) to parse webpages and then identify critical words within a webpage, then tag the webpages according to the identified critical words. The dynamic tagging method is explained in more detail below with respect to FIGS. 2 and 3.

Figure 2:
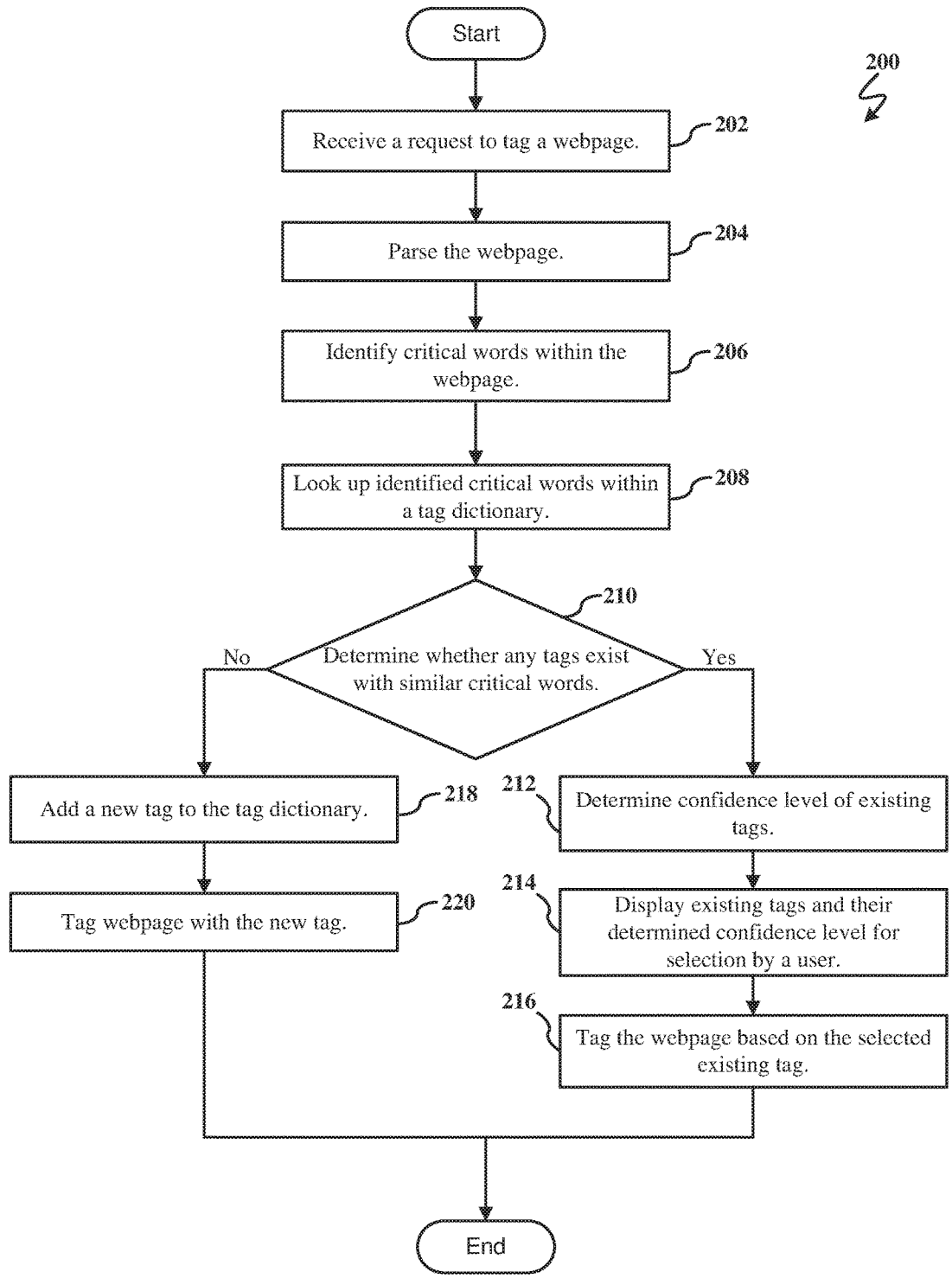
FIG. 2 illustrates an operational flowchart illustrating an exemplary tagging process by a dynamic tagging program according to at least one embodiment.

Referring now to FIG. 2, an operational flowchart illustrating the exemplary tagging process 200 by the dynamic tagging program 110a and 110b (FIG. 1) according to at least one embodiment is depicted. At 202, the dynamic tagging program 110a and 110b (FIG. 1) receives a request to tag a webpage. The request may have been submitted by a user. The request may have been an automatic setting made by the user as an option within the dynamic tagging program 110a and 110b (FIG. 1). For example, the dynamic tagging program 110a and 110b (FIG. 1) may have an option to automatically tag any webpage that the user may visit or view for a predetermined amount of time (e.g., five or ten minutes). The webpage may be any webpage on the Internet (e.g., a news webpage, a cooking webpage, an event webpage, etc.).

Then, at 204, the dynamic tagging program 110a and 110b (FIG. 1) parses the webpage. The dynamic tagging program 110a and 110b (FIG. 1) may parse the webpage, then generate corresponding data structures for one or more portions of the webpage. For example, the dynamic tagging program 110a and 110b (FIG. 1) may output parsed text elements from the webpage as data structures. Additionally, a parsed text element may be represented in the form of a parse tree or other graph structure. The dynamic tagging program 110a and 110b (FIG. 1) may also parse audio and video recordings within the webpage.

Furthermore, the dynamic tagging program 110a and 110b (FIG. 1) may be a natural language processing system capable of entity resolution techniques that may be helpful in identifying important entities with the webpage. Entity resolution techniques may identify concepts and keywords within a webpage or text. Once entities have been identified, correlations and linguistic links between entities may be detected and used to establish relevance of the entities and, ultimately, the context of the webpage. An example technique that may be useful in determining the relative importance of a given entity to the context of the passage is inverse document frequency, which utilizes the relative commonality of the entity as an indicator of its importance to evaluating context. Many other techniques may also be used. These same techniques may be useful for determining the main idea or critical words of a portion of content.

Next, at 206, the dynamic tagging program 110a and 110b (FIG. 1) identifies critical words within the webpage. The critical words may be identified by implementing known text analytics software and text analytic techniques to the parsed text elements. The critical words may be any words in the form of text, audio, or video that appears more than once or has a relative importance to the webpage (e.g., the webpage title). The identified critical words may be words within the text of the webpage or within an audio and video recording within the webpage. The identified critical words may be within a title or the uniform resource locator (URL) of the webpage. The identified critical words may appear on the webpage more than once and may be a different font (e.g. larger than other words within the webpage) or presented in a different manner than other words within the webpage (e.g., bolded or in italics). Additionally, the identified critical words may be listed in a table for visual view to the end user. The table may be ordered based on user pre-configuration (e.g., most important to least important).

In at least one embodiment, the dynamic tagging program 110a and 110b (FIG. 1) may also weight the identified critical words. Weighting may occur in instances when there are multiple identified critical words that are not relevant but appear multiple times within the webpage. For example, if unrelated identified critical words "surf" and "skyscraper" appear multiple times throughout the webpage, each word may be weighted to determine which word more accurately describes the content of the webpage for tagging. The dynamic tagging program 110a and 110b (FIG. 1) may weight each identified critical word according to the number of appearances within the webpage or according to the location within the webpage (e.g., in the title or URL). The identified critical words may be weighted according to the placement of the identified critical words within the table. The value of the weights given to the identified critical words may be adjusted by the user or automatically by the dynamic tagging program 110a and 110b (FIG. 1).

Then, at 208, the dynamic tagging program 110a and 110b (FIG. 1) looks up the identified critical words within a tag dictionary. The tag dictionary may be stored within a data repository (e.g., database 114). The tag dictionary may include the list of previously used tags and the critical words of the content where they have been used. The tag dictionary may include tags previously tagged by the dynamic tagging program 110a and 110b (FIG. 1). The tag dictionary may also include default tags for commonly visited webpages of the end user before the dynamic tagging program 110a and 110b (FIG. 1) was installed or used by the end user. For example, the default webpages may have been discovered by the dynamic tagging program 110a and 110b (FIG. 1) accessing the search history of the user.

Moreover, the tag dictionary may include a list of tags and their associated critical words. The tag dictionary may include two main fields: the tag name and the critical words. For example, the tag may be a name associated with the webpage made up by the end user or automatically generated by the dynamic tagging program 110a and 110b (FIG. 1). For example, a webpage for a technology event in Santa Monica may be tagged Silicon Beach by the end user. The critical words associated with the tag Silicon Beach may include critical words within the webpage identified by the dynamic tagging program 110a and 110b (FIG. 1), such as technology, Santa Monica, etc.

Then, at 210, the dynamic tagging program 110a and 110b (FIG. 1) determines whether any tags exist within the dictionary with similar critical words as the identified critical words. The dynamic tagging program 110a and 110b (FIG. 1) can search the tag dictionary for matching critical words or critical words that are confusingly similar (e.g., nearly the same meaning). For example, the confusingly similar words may be words that are closely related (e.g., "surf" and "beach"), synonyms (e.g., "bank" and "treasury"), and acronyms (e.g., "Los Angeles" and "L.A."). The tagging dictionary may be stored in a data repository (e.g., database 114 (FIG. 1)). The dynamic tagging program 110a and 110b (FIG. 1) can determine the tags associated with any of the matched critical words. If the dynamic tagging program 110a and 110b (FIG. 1) determines any tags exist within the tag dictionary with similar critical words as the identified critical words (step 210, "YES" branch), the tagging process 200 may continue to determine a confidence level of existing tags at step 212. If the dynamic tagging program 110a and 110b (FIG. 1) determines no tags exist within the tag dictionary with similar critical words as the identified critical words (step 210, "NO" branch), the tagging process 200 may continue to add a new tag to the tag dictionary at step 218.

If the dynamic tagging program 110a and 110b (FIG. 1) determines any tags exist within the tag dictionary with similar critical words as the identified critical words, then, at step 212, the dynamic tagging program 110a and 110b (FIG. 1) determines a confidence level of existing tags. The confidence level can be a strength of indication that the existing tag is related to the webpage. For example, if there exists a "tech event" tag for a technology event in Santa Monica and the webpage is about a technology event called computer meetup in Santa Monica, the confidence level might be high depending on the critical words associated with each event. The existing tags within the tag dictionary with similar critical words or matching critical words as the identified critical words are categorized according to one of three confidence levels: low confidence (i.e., 30% to 50% confidence), medium confidence (i.e., 50% to 80% confidence), or high confidence (i.e., 80% to 100% confidence). The confidence level can be determined in a substantially similar fashion as determining the previously described weight. The confidence levels can be determined based on frequency or location within the webpage. Furthermore, the confidence levels can be determined based on whether the critical words match, are acronyms, or are synonyms of the identified critical words. Rules determining how the confidence levels are assigned may be user configurable.

Then, at 214, the dynamic tagging program 110a and 110b (FIG. 1) displays the existing tags and their determined confidence level for selection by a user. The existing tags and their determined confidence level may be displayed within a UI or a graphical user interface (GUI). The existing tags and their associated confidence levels could be presented to the end user in different colors based on the level of confidence (e.g., green=high confidence, yellow=medium confidence, and red=low confidence). A displayed existing tag may be automatically selected by the dynamic tagging program 110a and 110b (FIG. 1) after no selection has occurred for a predefined amount of time (e.g., five minutes). The dynamic tagging program 110a and 110b (FIG. 1) may select the existing tag with the highest confidence level.

Next, at 216, the dynamic tagging program 110a and 110b (FIG. 1) tags the webpage based on the selected existing tag. The dynamic tagging program 110a and 110b (FIG. 1) may also update the selected existing tag in the tag dictionary with the associated identified critical words. The dynamic tagging program 110a and 110b (FIG. 1) may further record any data or metadata associated with the webpage into a data repository (e.g., database 114 (FIG. 1)) so that predictive models may be generated based on any collected data and metadata. Once the dynamic tagging program 110a and 110b (FIG. 1) tags the webpage based on the selected existing tag, the tagging process 200 may terminate.

However, if the dynamic tagging program 110a and 110b (FIG. 1) determines there are no existing tags within the tag dictionary with similar critical words as the identified critical words, then, at step 218, the dynamic tagging program 110a and 110b (FIG. 1) adds a new tag to the tag dictionary. The new tag may describe the webpage or be one of the identified critical words (e.g., the identified critical word with the highest weight). The new tag may be established (e.g. named) by the end user. The end user may choose a name for the tag, then manually tag the webpage with the named tag. Furthermore, the dynamic tagging program 110a and 110b (FIG. 1) may add any identified critical words to the tag dictionary.

Then, at 220, the dynamic tagging program 110a and 110b (FIG. 1) tags the webpage with the new tag. For example, once the new tag is added to the webpage a user may be able to see the webpage with the tag. The tag may be displayed in a portion of the webpage (e.g., in a corner of the webpage). The tag and any critical words associated with the tag may be updated in the tag dictionary. Once the dynamic tagging program 110a and 110b (FIG. 1) tags the webpage with the new tag, the tagging process 200 may terminate.

Figure 3:
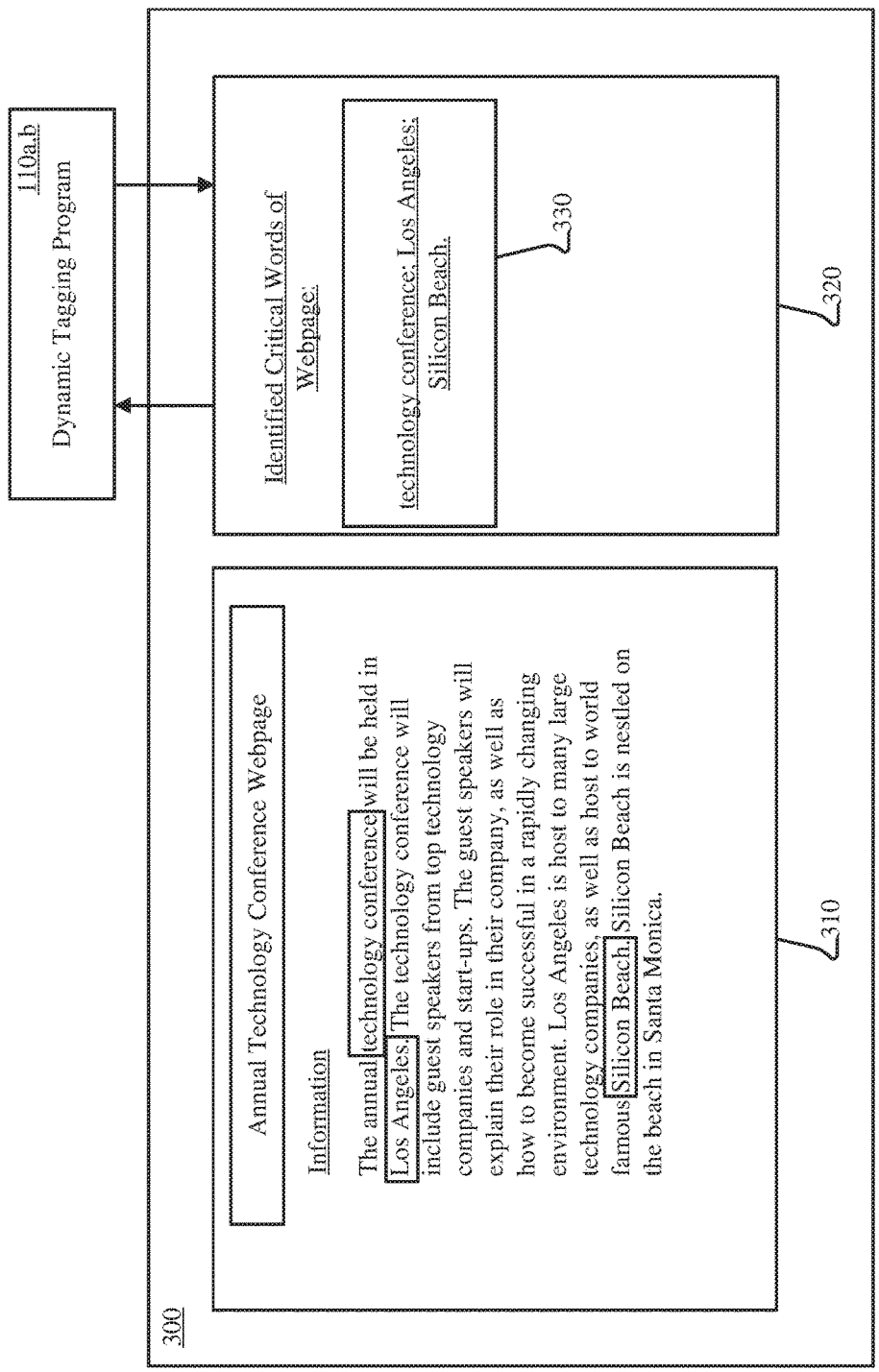
FIG. 3 is a block diagram of an example of critical words being identified by the dynamic tagging program according to at least one embodiment.

FIG. 3 is a block diagram of an example of critical words being identified by the dynamic tagging program 110a and 110b. Specifically, the diagram includes a screenshot 300 of an example webpage 310 and an associated identified critical words completion sidebar 320. The example webpage 310 is an "Annual Technology Conference Webpage." The identified critical words completion sidebar 320 may include a continuously or periodically updated collection of identified critical words 330 derived from performing parsing or natural language processing on the text, audio, or video on the webpage 310. The identified critical words completion sidebar 320 may be a GUI tool used to aid an end user in determining whether or not to tag the webpage 310 based on the critical words 330. The dynamic tagging program 110a and 110b may receive the identified critical words 330 to search through the tag dictionary in order to identify any existing tags with similar or matching critical words, and then generate, based on the dynamic tagging program 110a and 110b finding any existing tags, a list of the existing tags for the end user to select from to tag the webpage 310 within the identified critical words completion sidebar 320. In the depicted screenshot 300, the identified critical words completion sidebar 320 may include a visual display of the identified critical words 330. Furthermore, boxes may be used to indicate where the identified critical words are. In an alternate embodiment, guidelines may be used to indicate where the identified critical words are located within the webpage 310.

It may be appreciated that FIGS. 2 and 3 provide only an illustration of one embodiment and do not imply any limitations with regard to how different embodiments may be implemented. Many modifications to the depicted embodiment(s) may be made based on design and implementation requirements.

Figure 4:
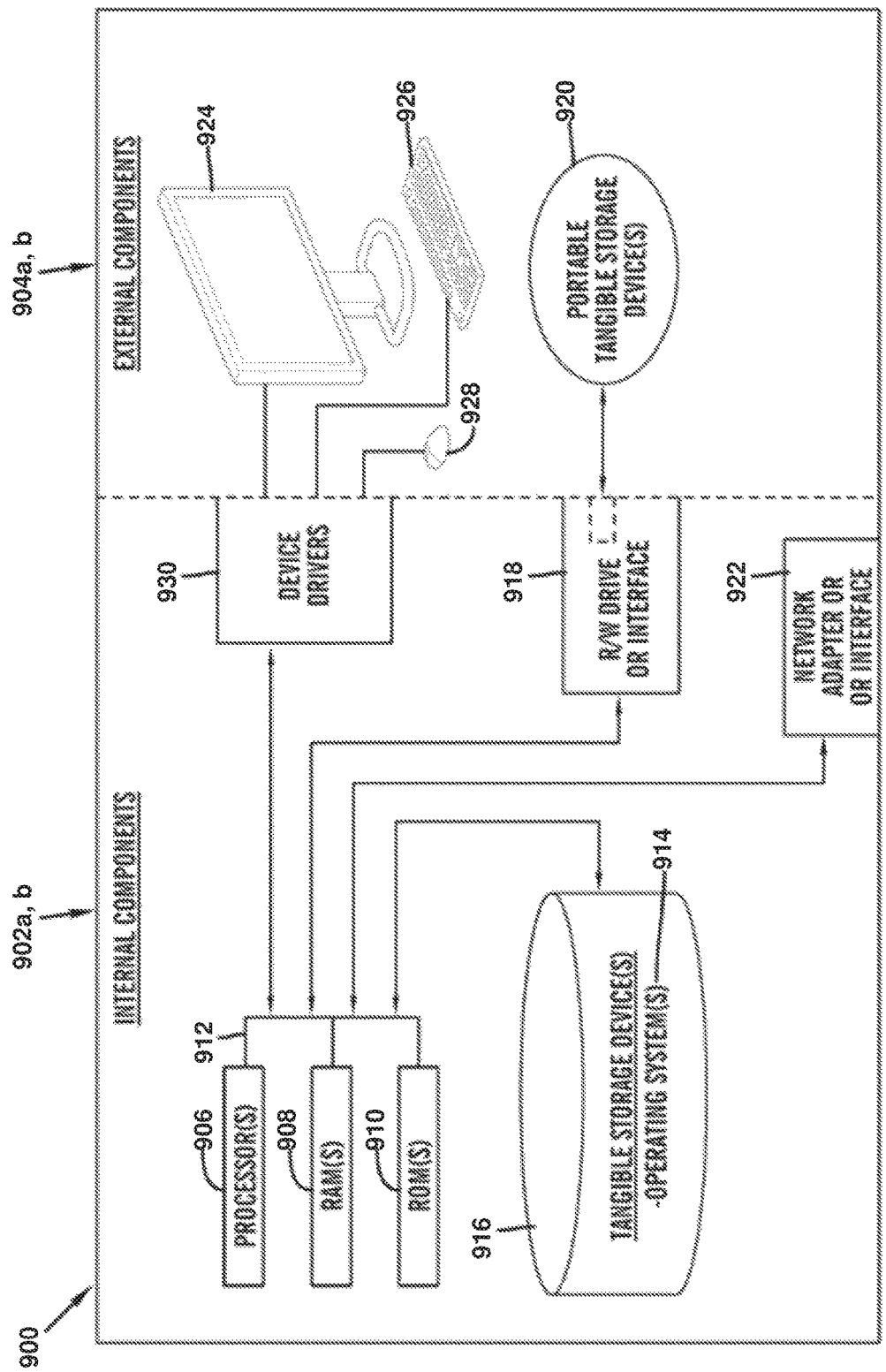
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) may include respective sets of internal components 902 a, b and external components 904 a, b illustrated in FIG. 4. Each of the sets of internal components 902 a, b includes one or more processors 906, one or more computer-readable RAMs 908, and one or more computer-readable ROMs 910 on one or more buses 912, and one or more operating systems 914 and one or more computer-readable tangible storage devices 916. The one or more operating systems 914 and the software program 108 (FIG. 1) and the dynamic tagging program 110a (FIG. 1) in client computer 102 (FIG. 1) and the dynamic tagging program 110b (FIG. 1) in network server 112 (FIG. 1), may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 (FIG. 1) and the dynamic tagging program 110a and 110b (FIG. 1) can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 (FIG. 1) and the dynamic tagging program 110a (FIG. 1) in client computer 102 (FIG. 1) and the dynamic tagging program 110b (FIG. 1) in network server computer 112 (FIG. 1) can be downloaded from an external computer (e.g., server) via a network (for example, the Internet, a local area network or other, wide area network) and respective network adapters or interfaces 922. From the network adapters (or switch port adaptors) or interfaces 922, the software program 108 (FIG. 1) and the dynamic tagging program 110a (FIG. 1) in client computer 102 (FIG. 1) and the dynamic tagging program 110b (FIG. 1) in network server computer 112 (FIG. 1) are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926, and computer mouse 928. The device drivers 930, R/W drive or interface 918, and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
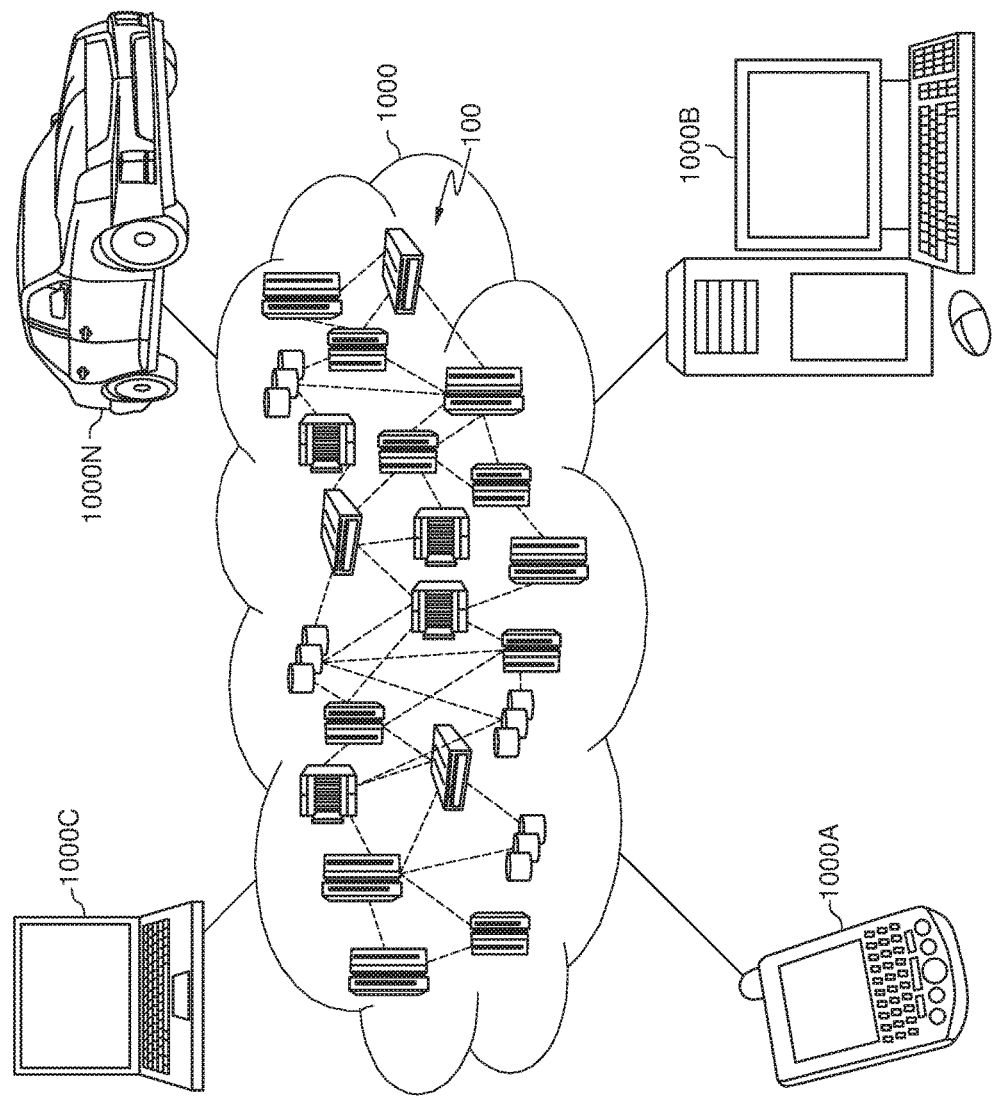
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
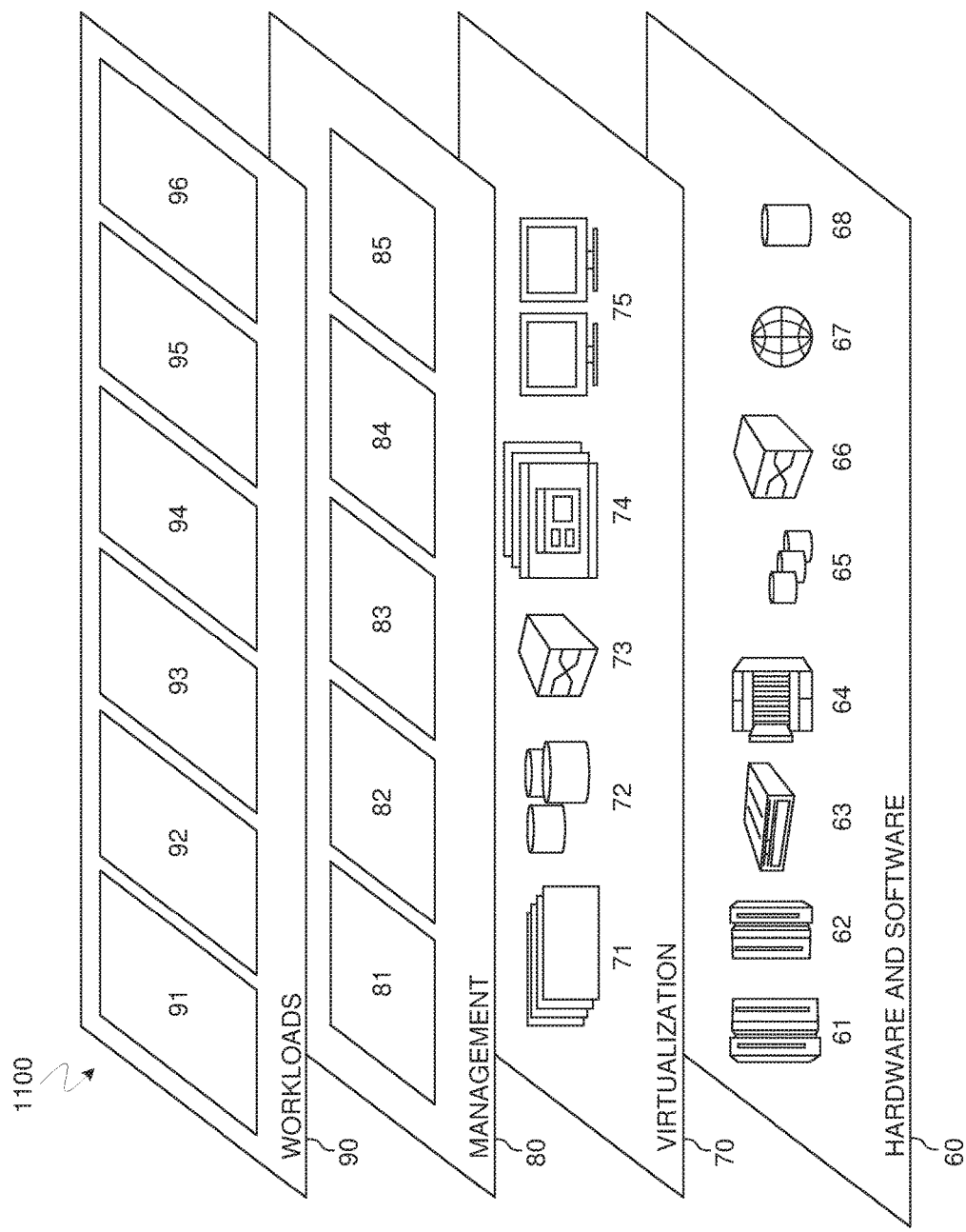
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dynamic tagging 96. Dynamic tagging 96 provides a way to dynamically tag webpages by parsing the webpage for critical words, then searching a tag dictionary for matching or similar critical words. Dynamic tagging 96 generates a list of existing tags based on levels of confidence to an end user for selection, then tags the webpage according to the end user's selection. Dynamic tagging 96 may tag the webpage with the critical words or with a tag created by the end user, if no existing tags are located within the tag dictionary.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for dynamically tagging a webpage, the method comprising:
   receiving, by a processor, a webpage from a network server;
   receiving, by the processor, a request to tag the webpage;
   parsing, by the processor, the webpage in response to the received request to tag the webpage;
   determining, by the processor and based on parsing the webpage, one or more critical words within the parsed webpage that describe the parsed webpage;
   searching, within a database and by the processor, a tag dictionary for the one or more critical words, wherein the tag dictionary includes a plurality of critical words and tags associated with the plurality of critical words;
   displaying, by the processor, one or more tags for selection by a user in response to searching the tag dictionary; and
   tagging, by the processor, the webpage with a received selection of a tag of the one or more tags.

2. The method of claim 1, wherein the processor is a natural language processor capable of entity resolution techniques, wherein parsing the webpage comprises:
   identifying, by the natural language processor, concepts and keywords within the webpage;
   detecting, by the natural language processor, correlations and linguistic links between the identified concepts and keywords; and
   establishing, based on the natural language processor utilizing the correlations and linguistic links, relevance of the correlations and linguistic links to determine a context of the parsed webpage, and wherein determining the one or more critical words is based on the determined context.

3. The method of claim 1, further comprising:
   determining, by the processor, that the one or more critical words do not have any associated tags in the tag dictionary; and
   adding, by the processor, a new tag to the tag dictionary, wherein the new tag is associated with at least one of the one or more critical words.

4. The method of claim 3, wherein the new tag is automatically determined based on the one or more critical words.

5. The method of claim 3, wherein the new tag is established by the user.

6. The method of claim 1, further comprising:
   identifying, in the tag dictionary and based on the searching, the one or more tags, wherein the one or more tags are associated with the one or more critical words in the tag dictionary;
   determining, by the processor, an associated confidence level for each of the one or more tags; and
   displaying the associated confidence level for the one or more tags when the one or more tags are displayed to the user for selection.

7. The method of claim 6, wherein the one or more tags are displayed according to the confidence level of each of the one or more tags.

8. The method of claim 1, wherein the one or more tags are displayed within a graphical user interface device coupled to the processor.

9. A computer system for dynamically tagging a webpage, the computer system comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   receiving, by a processor, a webpage from a network server;
   receiving, by the processor, a request to tag the webpage;
   parsing, by a natural language processor, the webpage in response to the received request to tag the webpage;
   determining, by the natural language processor and based on parsing the webpage, one or more critical words within the parsed webpage that describe the parsed webpage;
   searching, within a database and by the processor, a tag dictionary for the one or more critical words, wherein the tag dictionary includes a plurality of critical words and tags associated with the plurality of critical words;

displaying, by the processor, one or more tags for selection by a user in response to searching the tag dictionary; and tagging, by the processor, the webpage with a received selection of a tag of the one or more tags.

10. The computer system of claim 9, wherein the method further comprises:

determining that the one or more critical words are in the tag dictionary;

identifying, in the tag dictionary and based on the searching, the one or more tags, wherein the one or more tags are associated with the one or more critical words in the tag dictionary;

determining, by the processor, an associated confidence level for each of the one or more tags; and displaying the associated confidence level for the one or more tags when the one or more tags are displayed to the user for selection.

11. The computer system of claim 10, wherein the method further comprises:

determining, by the processor, that the one or more critical words do not have any associated tags in the tag dictionary; and adding, by the processor, a new tag to the tag dictionary, wherein the new tag is associated with at least one of the one or more critical words.

12. The computer system of claim 11, wherein the new tag is automatically determined based on the one or more critical words.

13. The computer system of claim 11, wherein the new tag is established by the user.

14. The computer system of claim 10, wherein the one or more tags are displayed according to the confidence level of each of the one or more tags.

15. The computer system of claim 9, wherein the one or more tags are displayed within a graphical user interface device coupled to the processor.

16. A computer program product for dynamically tagging a webpage, the computer program product comprising:

one or more computer-readable storage medium and program instructions stored on at least one of the one or more tangible storage medium, the program instructions executable by a processor, the program instructions comprising:

program instructions to receive, by a processor, a webpage from a network server;

program instructions to receive, by the processor, a request to tag the webpage;

program instructions to parse, by a natural language processor, the webpage in response to the received request to tag the webpage;

program instructions to determine, by the natural language processor and based on parsing the webpage, one or more critical words within the parsed webpage that describe the webpage;

program instructions to search, within a database and by the processor, a tag dictionary for the one or more critical words, wherein the tag dictionary includes a plurality of critical words and tags associated with the plurality of critical words;

program instructions to display, by the processor, one or more tags for selection by a user in response to searching the tag dictionary; and program instructions to tag, by the processor, the webpage with a received selection of a tag of the one or more tags.

17. The computer program product of claim 16, further comprising:

program instructions to identify, in the tag dictionary and based on the searching, the one or more tags, wherein the one or more tags are associated with the one or more critical words in the tag dictionary;

program instructions to determine, by the processor, an associated confidence level for each of the one or more tags; and program instructions to display the associated confidence level for the one or more tags when the one or more tags are displayed to the user for selection.

18. The computer program product of claim 16, further comprising:

program instructions to determine, by the processor, that the one or more critical words do not have any associated tags in the tag dictionary; and program instructions to add, by the processor, a new tag to the tag dictionary, wherein the new tag is associated with at least one of the one or more critical words.

19. The computer program product of claim 18, wherein the new tag is automatically determined based on the one or more critical words.

20. The computer program product of claim 18, wherein the new tag is established by the user, wherein the one or more tags are displayed within a graphical user interface device coupled to the processor, and wherein the one or more tags are displayed according to the confidence level of each of the one or more tags.

* * * * *